Feb. 24, 1953       J. M. KAHN ET AL       2,629,367
TREATMENT OF BOILER WATER
Filed March 21, 1947
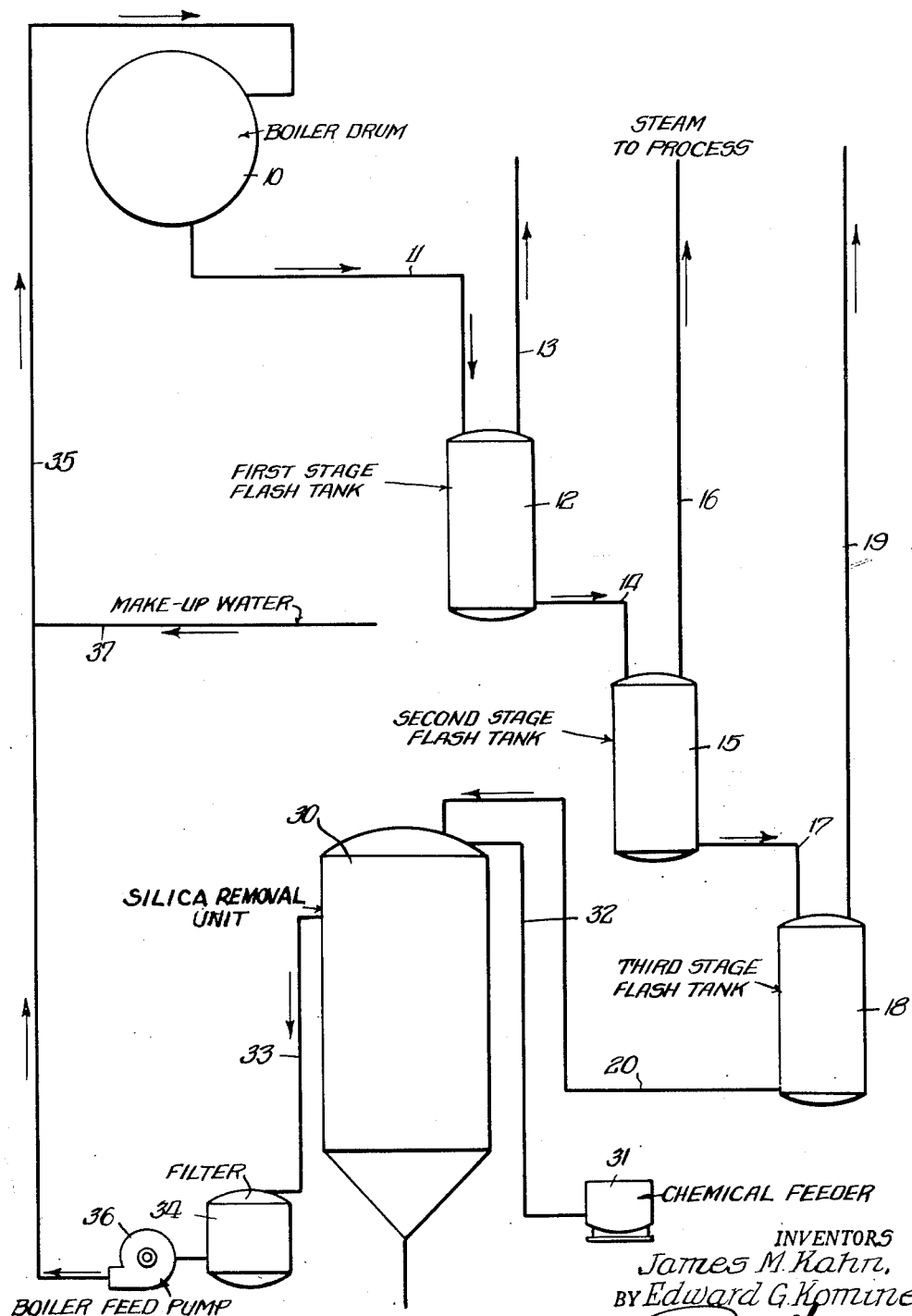
INVENTORS
James M. Kahn,
BY Edward G. Kominek,
Robyn Wilcox
ATTY.

Patented Feb. 24, 1953

2,629,367

UNITED STATES PATENT OFFICE 2,629,367

TREATMENT OF BOILER WATER

James M. Kahn, Glencoe, and Edward G. Kominek, Chicago, Ill., assignors to Infilco Incorporated, Chicago, Ill., a corporation of Delaware Application March 21, 1947, Serial No. 736,180

9 Claims. (Cl. 122—397)

The present invention relates to a method for removing silica from the water of a high pressure boiler.

A primary object of the present invention is to establish a circulation of water from a boiler and back to the boiler and to treat the water during such circulation to remove silica therefrom and thereby to provide a lower concentration of silica in the boiler.

A still further object of our invention is to so operate a high pressure boiler as to conserve a considerable amount of heat and chemicals.

The use of high pressure boilers is desirable in many larger industries but heretofore such use has been uneconomical because of the great expense incurred by the necessity of frequent blowdowns due to the silica content of the water in the high pressure boilers. It is a well recognized fact that as the pressures increase the amount of silica in the boiler water must be decreased considerably, and that the maximum amount of silica permissible is not a linear function of pressure, but is progressively smaller. For example, the commonly accepted standards for the maximum allowable silica ("silica" being the term used to denote any silica compound in the water, usually present as $SiO_2$) are:

| Operating Pressure, p. s. i. | Total Silica, parts per million |
| --- | --- |
| 0 to 200 | 100 |
| 201 to 400 | 65 |
| 401 to 600 | 45 |
| 601 to 900 | 30 |
| 901 to 1,500 | 5 to 10 |

These figures compare with the following commonly accepted maximum permissible concentrations of dissolved solids in boiler water:

| Operating Pressure, p. s. i. | Dissolved Solids, parts per million |
| --- | --- |
| Less than 300 | 3,500 |
| Less than 450 | 3,000 |
| Less than 600 | 2,500 |
| Less than 750 | 2,000 |
| Less than 900 | 1,500 |
| Less than 1,000 | 1,250 |
| Less than 1,500 | 1,000 |

Heretofore it has been proposed that the hardness imparting constituents of water be removed from the boiler blowdown in order to save that water and the heat and chemicals contained therein. However, former procedures removed hardness imparting constituents only, but did not effect any removal of silica. In numerous cases the amount of silica in the boiler water is the factor that controls boiler blowdown. While total solids and the amount of alkalinity are factors to be considered, ordinarily the alkalinity and total solids concentrations permissible are not reached until the maximum silica concentrations have been passed. That is, boiler feed water contains much less total solids and alkalinity, relatively speaking, then silica, so that heretofore it has been necessary to blow down the boiler long before it would be necessary on the basis of total solids or alkalinity. Thus a process that will remove sufficient silica from the water of a high pressure boiler to permit its use until it must be wasted because of other characteristics is of considerable commercial importance.

It is obvious that if one is working a boiler at a pressure of 1000 to 1500 pounds gauge, and the boiler feed water has its silica content reduced to the average figure of about 2½ parts per million, only 2 to 4 cycles of concentration are permitted with operation at such a pressure. This means that from 50 to 25 per cent of the water contents of a boiler must be wasted in boiler blowdown. Similarly, at a lesser pressure, say about 900 pounds, the silica content of the water in the boiler may not exceed above 30 parts per million, allowing about 10 cycles of concentration, or what is saying the same thing, blowing down about 10% of the total water in the boiler. It is obvious, therefore, that as high pressures are used, it is necessary to waste increasingly large amounts of the water contents of the boiler in order to maintain the silica concentration below dangerous levels. It is for this reason that the use of high pressure boilers has not been more wide spread, as the economies resulting from high pressure operation were more than off-set by the expense of softening and heating the increasingly large amounts of boiler feed water.

There are several methods of removing silica from fresh water but the only practical one heretofore proposed fails to reduce silica below about 2 or 3 parts per million, and usually does not reduce it below 5 parts per million, when treating a water with a silica content on the order of 10 parts per million to 50 parts per million. It should be noted that the removal of silica is not an absolute factor but one which is proportional to the amount of silica in the original water— the amount of treatment remaining the same. Thus, for example, if the original silica concentration was about 50 parts per million the best treatment heretofore would ordinarily be expected to reduce this concentration to about one-tenth its original figure, or a little more (5 to 10 parts per million). However, if the original water contained only 5 parts per million it would be expected that a water containing only 2 or 3 parts per million would be secured at the end of the treatment.

The present invention relates to a process of withdrawing a portion of water from the boiler, treating the withdrawn portion to remove silica therefrom and returning it to the boiler. In this manner the silica content of the water in the boiler is decreased and the period increased during which the water can be used in the boiler without exceeding the permissible silica concentration. Incidentally, some objectionable alkalinity is also removed by our treatment for silica removal.

The silica is removed from the withdrawn portion of the water of a boiler by treating such portion, after flashing to reduce pressures to substantially atmospheric, with an inorganic magnesium compound, preferably magnesium sulfate. Such treatment ordinarily will take place in a hot process water treating apparatus, such as that illustrated in the patent to Green, No. 1,684,822. By the reaction of the magnesium compound with the causticity present in the water withdrawn from the boiler a precipitate of magnesium hydroxide is formed, which adsorbs silica from the water undergoing treatment. A typical reaction of magnesium sulfate with water withdrawn from a boiler is as follows:

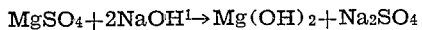

$$MgSO_4 + 2NaOH^1 \rightarrow Mg(OH)_2 + Na_2SO_4$$

¹ There is always some caustic present in boiler water.

The magnesium hydroxide precipitate formed, as indicated above, adsorbs the major portion of the silica content. Such treatment does not reduce the total solids content, but it permits continued use of the withdrawn portion of water in the boiler until the total solids contents or alkalinity make a blowdown necessary, with consequent saving in softening chemicals (usually including expensive phosphates). It may also be pointed out that the magnesium hydroxide adsorbs silica much more efficiently at high temperatures, so that it is desired to operate the water treating unit at a temperature as high as economically feasible, usually slightly over atmospheric pressure, i. e. at a temperature of slightly above 100 degrees centigrade.

In connection with our process of silica removal, it is entirely feasible to use common reagents to reduce the total amount of alkaline solids to below the maximum allowed. However, as the limit of silica allowable is more rapidly approached than the upper limits of the total dissolved solids, and also is much more difficult to control, it is obvious that the use of high pressure boilers has been prevented primarily by the economics of silica removal.

Our invention will be readily understood from a consideration of the drawing which shows diagrammatically a treating plant utilizing our invention.

A portion of the water contents of a high pressure boiler 10 is withdrawn through pipe 11 to a flash tank 12, which preferably will be first of a series. As is well known, such flash tanks, in which the pressure is substantially reduced, give a supply of steam, which may be withdrawn through steam line 13, and hot water, which may be withdrawn through hot water line 14. Water from the conduit 14 can be led into a second stage flash tank 15 in which steam is again liberated, steam being withdrawn through steam line 16, and hot water withdrawn through hot water line 17. In the drawing we show a third stage flash tank 18 from which steam is withdrawn through line 19, and hot water withdrawn through line 20. It is well known in the art that the steam withdrawn from the flash tanks, such as 12, 15 and 18, is suitable for many uses around such a plant and it is contemplated that all such steam will be used in connection with the steam plant. However, hot type water softeners usually are not adapted to operate at the extremely high pressures of the boiler, so that it is necessary to reduce the pressure between boiler drum and the softening unit. This can be done in any number of stages, and for purposes of illustration we show three.

The hot water withdrawn from the final stage flash tank 18, through the line 20, is introduced in the usual manner into a hot type water softening unit 30. Also fed into the unit, preferably adjacent the hot water inlet, is a supply of a magnesium salt solution taken from chemical feeder 31 and introduced into the softening unit through a suitable conduit 32. As indicated above, we prefer to use magnesium sulfate because of its cheapness and because of the speed and efficiency of its reaction. However magnesium chloride would be equally effective and magnesium carbonate has also been found suitable. All of these compounds produce a highly efficient magnesium hydroxide which adsorbs the silica and also form an acid which reduces alkalinity.

Preferably the treated water, taken from the treating tank 30, is withdrawn through conduit 33 and is filtered in a suitable filter 34 and returned to the boiler feed line 35 by any suitable means, such as pump 36. Obviously there will be some steam losses so that it will always be necessary to supply an amount of make-up water through a suitable line such as 37, it being understood that such make-up water will be softened as is heretofore known in the art.

It is believed obvious that our treatment is more economical than prior processes, which usually have resorted to boiler blowdown and the use of increasingly large amounts of fresh make-up water necessitated thereby, as soon as the silica content of the water in the boiler became objectionably high. By our process the silica in the withdrawn portion of the water in the boiler is materially reduced, as with our process, operating at a temperature of 100 degrees centigrade, silica removal is highly efficient. Thus, the treated water can be returned to the boiler and will have its silica concentration reduced to the range of from about one-third to about one-fourth that of the untreated water in the boiler, using reasonable amounts of magnesium salt. While additional amounts of chemical will reduce the silica content even further, such a reduction to the range of one-fourth to one-half is sufficient to permit reuse of the thus treated water until it would have to be wasted because of its total solids content. Thus if this treated portion of water can be reused once, it means that the amount of blowdown is cut in half and the amount of make-up required for this loss is also reduced one-half. As boiler water treatment is very expensive, such a saving becomes very important. Also there will be a considerable saving in heat as there is little waste of steam in the flashing stages and the water returned to the boiler has a temperature of approximately 100 degrees centigrade.

Our treatment can be illustrated by the results based upon water withdrawn from a boiler of one particular plant. This water was rather turbid and filtered quite poorly and had a silica content (present as $SiO_2$) of 110 parts per million. The water from the boiler was treated at approximately the boiling point with various magnesium salts and in all instances some reduction of silica was secured. When treated with 150 to 200 parts per million of magnesium salt the results were hardly satisfactory, although a noticeable improvement was secured. However, when treated with 250 to 500 parts per million very noticeable and satisfactory removal was secured. For example, when a sample of the water was treated with 500 parts per million of magnesium sulfate, the silica content was reduced to less than 40 parts per million, the results of a number of experiments averaging 38.5. When magnesium carbonate was used as the reagent the average result was approximately 50 parts per million in the effluent, using similar amounts of salt. When magnesium chloride was used the operating results were somewhat better, the average being about 20 parts per million.

In all cases additional amounts of the magnesium salts were found to secure additional silica reduction, but the reduction was not proportional to the additional chemical used. As indicated above, treatment with 150 to 200 parts per million gave unsatisfactory results, while treatment with more than 500 parts per million gave reductions that were not economically sound. However, treatment with 300 to 500 parts per million of all of these salts gave efficient and excellent reduction of silica content. It might also be mentioned that silica reduction was tested using an activated magnesium (MgO). Silica reduction was secured by this treatment but it was not as efficient as the treatment with the soluble magnesium salts. It is believed that this is due to the fact that the magnesium salts react with caustic in the water to form magnesium hydroxide in situ which adsorbs silica more efficiently than a preformed magnesium hydrate.

Thus we have found that the various soluble magnesium salts are suitable in our treatment, and are very efficient when used in dosages of between 300 to 500 parts per million. Magnesium chloride gave best results, but ordinarily magnesium sulfate would be preferred because of its cheapness. While reduction with magnesium sulfate is not as great as with the magnesium chloride, the treatment is cheaper and the results are such that the treated water can be reused until it must be wasted because of its total solids content.

The above examples will be illustrative of our invention, which obviously can be applied to the treatment of high pressure evaporators, and similar installations, as well as high pressure boilers. These embodiments are therefore to be considered as illustrations of our invention but not as limitation thereof, as manifestly the process and apparatus mentioned can be varied without departing from the spirit of the invention as defined in the claims. It will also be understood that while we have spoken of the removal of silica apparently by adsorption in the magnesium hydrate precipitate, we are not limited by such a theory of operation. It will also be understood that our process does not relate to the treatment of boiler feed water but is concerned with reducing the silica concentration in a boiler by continuously withdrawing a portion of the water from the boiler, treating it in the manner described and returning it to the boiler. It will, therefore, also be understood that where we speak of "boiler water" herein this term designates water in or from the boiler as distinguished from "boiler feed water" or "boiler make-up water."

We claim:

1. In the operation of a high pressure boiler a method of reducing the number of blowdowns necessary to those due to alkalinity and total solids concentration only which comprises continuously withdrawing from the boiler a portion of water having a silica concentration approximating the limits predetermined by the operating pressure of the boiler, treating such withdrawn portion of water separately from any make-up water with an inorganic magnesium compound capable of reacting with chemicals in the water to form a precipitate of magnesium hydroxide which adsorbs silica, separating the magnesium hydroxide precipitate with contained silica from the treated water, returning the treated low silica water to the boiler, and continuing the treatment on successive portions of the water from the boiler until the alkalinity and total solids concentration in the boiler have reached their permissible limits necessitating blowdown and wasting of the blowdown water.

2. A process of maintaining the silica concentration in a high pressure boiler within the limits predetermined by the operating pressure of the boiler which comprises continuously withdrawing from the boiler a portion of the water having a silica concentration approximating the permissible limits, flashing the withdrawn portion of water to reduce the temperature and pressure thereof, treating the concentrated hot boiler water resulting from the flashing step separately from any make-up water with an inorganic magnesium salt, thereby forming a precipitate of magnesium hydroxide which adsorbs silica from the water, separating the precipitate so formed with contained silica from the treated water, returning the treated water to the boiler and adding only sufficient make-up water to the boiler to compensate for water losses due to flashing.

3. A process according to claim 2 wherein the inorganic magnesium salt is magnesium sulfate.

4. The process of claim 2 wherein the inorganic magnesium salt is magnesium chloride.

5. The process of claim 2 wherein the inorganic magnesium salt is magnesium carbonate.

6. A process according to claim 1 wherein said magnesium compound is taken from the class consisting of magnesium sulphate, magnesium chloride, magnesium carbonate, magnesium hydroxide and magnesium oxide.

7. The process of maintaining the silica concentration in a boiler within predetermined limits which comprises withdrawing a portion of the water containing silica from the boiler, flashing the withdrawn water to reduce the temperature thereof to about its boiling point, treating the concentrated boiler water resulting from the flashing step undiluted by any make-up water with an amount of an inorganic magnesium salt ranging from 300 to 500 parts per million of water, thereby forming a precipitate of magnesium hydroxide which adsorbs the silica, separating the water freed of the major portion of its silica content from the precipitate with adsorbed silica, and returning the treated water to the boiler.

8. A method of operating a high pressure boiler to prevent the necessity of frequent blowdowns due to silica concentration in excess of those permissible under the operating pressure of the boiler comprising establishing a continuous circulation of a portion of the water in the boiler containing silica through an external treating zone and back to the boiler and treating said circulating portion undiluted by make-up water during passage through said zone with an inorganic magnesium salt thereby precipitating magnesium hydroxide which adsorbs silica from the water, separating water free of a major portion of its silica content from said precipitate containing adsorbed silica, and returning the treated water to the boiler whereby the silica concentration in the boiler is lowered.

9. A method of maintaining the silica concentration in a high pressure boiler within the limits predetermined by the operating pressure of the boiler comprising treating successive portions of such water externally of the boiler and separately from any make-up water with an inorganic magnesium salt, thereby precipitating magnesium hydroxide which adsorbs silica from the water, separating the precipitate with adsorbed silica from the treated water, and returning the treated water to the boiler, thereby reducing the silica concentration in the boiler.

JAMES M. KAHN.
EDWARD G. KOMINEK.

REFERENCES CITED

The following references are of record in the file of this patent:

UNITED STATES PATENTS

| Number | Name | Date |
|---|---|---|
| 468,863 | Baxter | Feb. 16, 1892 |
| 497,046 | Benjamin | May 9, 1893 |
| 1,683,521 | Bourgognion et al. | Sept. 4, 1928 |
| 1,737,448 | Bauer | Nov. 26, 1929 |
| 1,926,953 | McGill | Sept. 12, 1933 |
| 2,194,524 | Lindsay | Mar. 26, 1940 |
| 2,298,707 | Liebknecht | Oct. 13, 1942 |
| 2,307,466 | Noll et al. | Jan. 5, 1943 |
| 2,312,570 | Meier | Mar. 2, 1943 |
| 2,376,897 | Behrman | May 29, 1945 |
| 2,382,902 | Pankey et al. | Aug. 14, 1945 |
| 2,401,924 | Goetz | June 11, 1946 |
| 2,428,418 | Goetz et al. | Oct. 7, 1947 |